Figure 1:
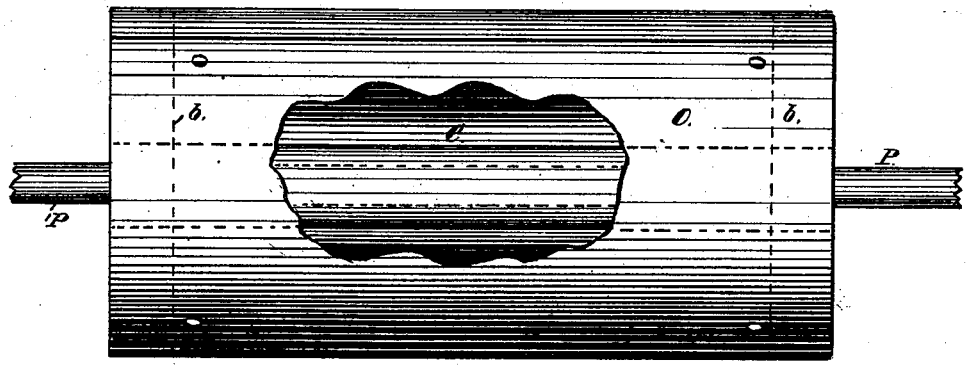
Figure 2:
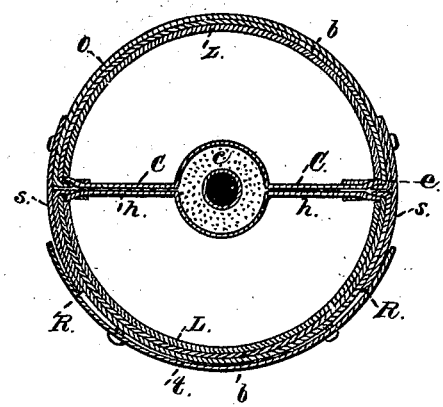
Figure 3:

P. CAREY.
COMPOSITION COVERING FOR STEAM-PIPES.

No. 189,301. Patented April 10, 1877.

Witnesses:
Chas. M. Peck
Wm. Ritchie

Inventor:
Philip Carey
by his Attys.
Peck & Co.

UNITED STATES PATENT OFFICE.

PHILIP CAREY, OF PHILADELPHIA, PENNSYLVANIA.

IMPROVEMENT IN COMPOSITION COVERING FOR STEAM-PIPES.

Specification forming part of Letters Patent No. 189,301, dated April 10, 1877; application filed April 25, 1876.

*To all whom it may concern:*

Be it known that I, PHILIP CAREY, of Philadelphia, in the county of Philadelphia and State of Pennsylvania, have invented certain new and useful Improvements in Composition Coverings for Steam-Pipes; and I do hereby declare the following to be a full, clear, and exact description of the same.

This invention relates to all classes of steam-pipes in which it is desirable to retain the heat and prevent its loss by radiation. I propose to accomplish the result by covering the pipes with a non-conducing plastic composition which is cheap and of sufficient cohesiveness to retain its form and position upon the pipes without any exterior covering.

The following are the ingredients of this composition, mixed in the proportions stated, viz: Fine wood-ashes, one-third, ($\frac{1}{3}$;) Manila fiber, one-sixth, ($\frac{1}{6}$;) steamed sawdust, one-sixth, ($\frac{1}{6}$;) plaster-of-paris, one-twelfth, ($\frac{1}{12}$;) white glue, one-twelfth, ($\frac{1}{12}$;) air-slaked lime, one-sixth, ($\frac{1}{6}$.) I do not wish, however, to be confined to these exact proportions, as slight variations in this respect will not materially affect the nature of the composition.

The above-mentioned ingredients, in substantially the proportions given, are placed in any suitable receptacle, and are macerated and brought to a suitable consistency for applying to the pipes, upon which it hardens, and forms a durable non-conducting covering.

Having thus described my invention, what I claim is—

A non-conducting covering for steam-pipes. consisting of the following ingredients: fine wood-ashes, steamed sawdust, Manila fiber, plaster-of-paris, white glue, air-slaked lime, all combined in substantially the proportions specified.

Witness my hand this 15th day of April, A. D. 1876.

PHILIP CAREY.

Witnesses:
    CHAS. M. PECK,
    WM. RITCHIE.